March 18, 1969   H. O. PETERSEN   3,433,023
IRRIGATION SYSTEMS
Filed Jan. 11, 1967
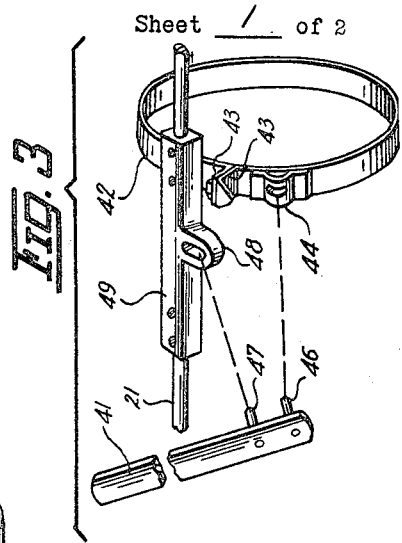
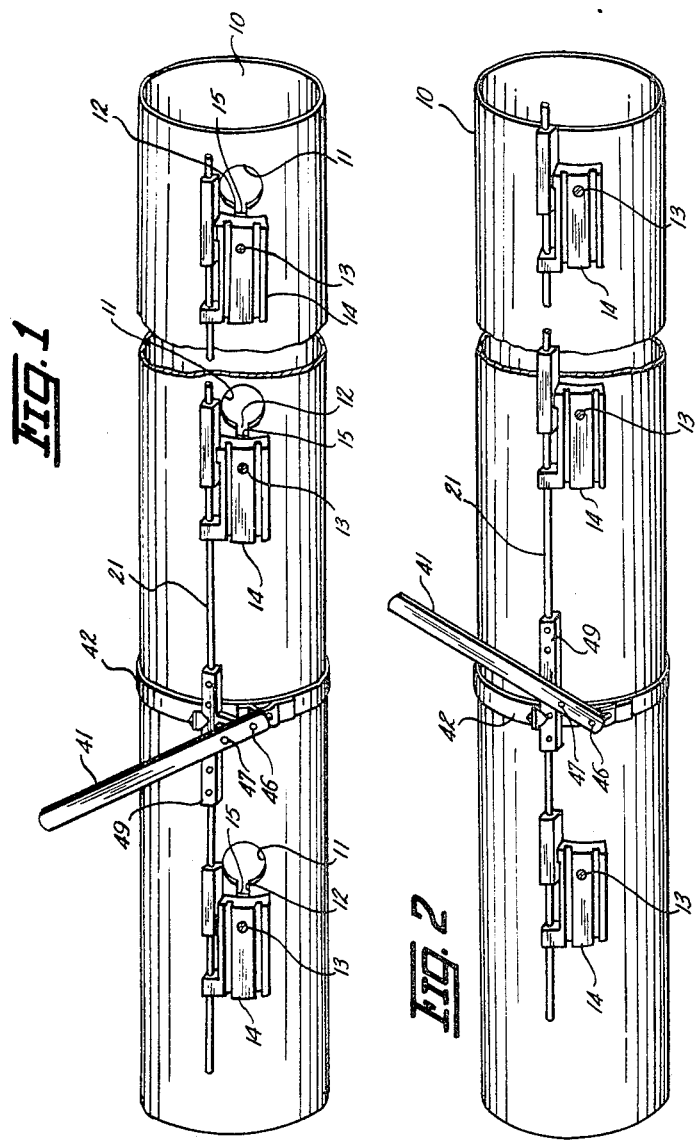
INVENTOR.
HARLIE O. PETERSON
BY Corey & Corey
ATTORNEYS

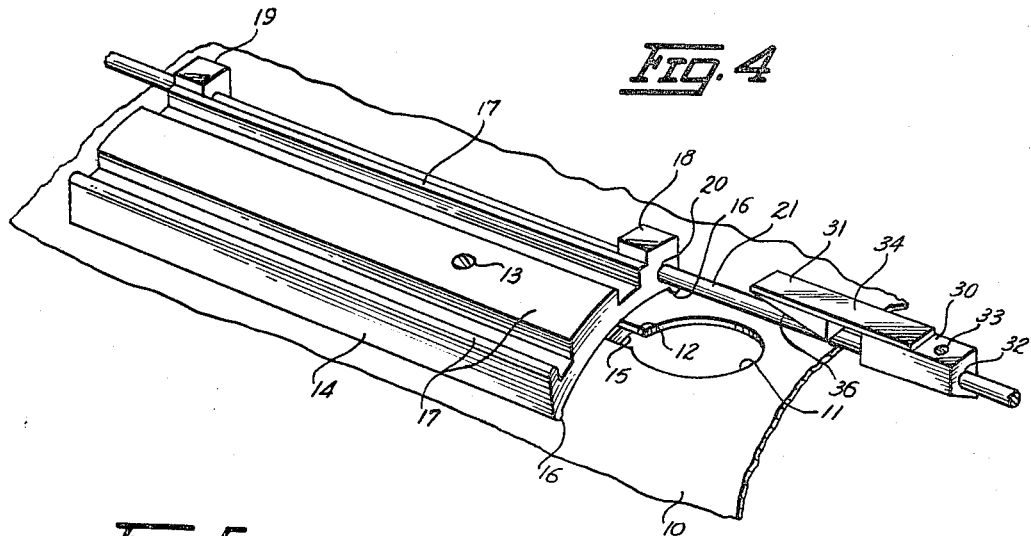
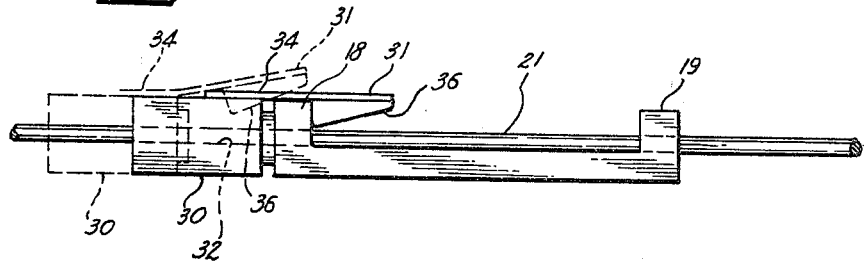
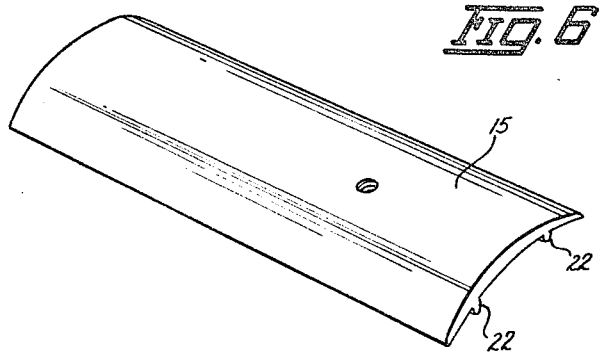

United States Patent Office 3,433,023
Patented Mar. 18, 1969

3,433,023
IRRIGATION SYSTEMS
Harlie O. Petersen, 4012 C St., Lincoln, Nebr. 68510
Filed Jan. 11, 1967, Ser. No. 608,678
U.S. Cl. 61—12                                      3 Claims
Int. Cl. A01g 25/02; E02b 13/02, 13/00

ABSTRACT OF THE DISCLOSURE

An operating and actuating structure for the multiple valves of an above-the-ground irrigation system in which a rod and latch structure is employed to open the valves to any desired degree, and latches on the rod of each valve are employed to close part or all of the valves.

---

This invention relates to irrigation systems and has particular relation to means in high volume, low pressure systems for discharging and controlling the discharge of water from the delivery ends of the pipe. The irrigating system in which I am now concerned is that type usually used for irrigating farms and fields and in which the pipes are light weight and readily connected and disconnected and readily portable. For instance, the pipe might be of aluminum 6 inches in diameter and the discharge end of the pipe system might be a length of 30 feet or so and have 8 or 9 openings therein for water gates for controlling the flow of water from the end of the pipe, distributing it in a desirable manner.

One of the main objects of my invention is to provide a new and improved multiple control structure for controlling the flow of water from the discharge end of the pipe and, in such a system, to provide a multiple valve closure and opening system which is low in cost and yet reliable in operation, and in which the structures are simple and relatively inexpensive to manufacture and operate.

Another object of my invention is to provide an irrigating control system which may have the valve structures composed of nonrusting materials and which may be molded or cast in quantities from a simple mold.

Still another object of my invention is to provide a system in which the various parts are readily assembled and disassembled in the field without moving the pipe.

Other and further features and objects of the invention will be more apparent to those skilled in the art upon a consideration of the accompanying drawings and following specifications, wherein is disclosed a single exemplary embodiment of the invention, with the understanding, however, that such changes may be made therein as fall within the scope of the appended claims, without departing from the spirit of the invention.

In said drawings:

FIGURE 1 is a view in perspective of the distribution end of a pipe line, having a multiple control means mounted thereon in accordance with one embodiment of my invention. The control system is in the open condition.

FIGURE 2 is a view of the pipe line end shown in FIGURE 1 but with the valves in the closed condition.

FIGURE 3 is a view in exploded relation of the operating lever and fulcrum means and the actuating rod and latch shown in FIGURES 1 and 2.

FIGURE 4 is a view in perspective of a cover such as that shown in FIGURES 1 and 2.

FIGURE 5 is a view in perspective of the hook and the hook anchor utilized in moving the valve covers to the closed position, and FIGURE 6 is a view in perspective of the valve which is located inside the pipe. This valve is operatively engaged to the cover shown in FIGURE 4.

Referring now to the drawings:

The pipes 10, previously referred to, are usually 6 inches to 10 inches in diameter of relatively light aluminum. Since the water is not under any great pressure, the discharge portion of the pipe is provided with a plurality of openings 11 for permitting water to flow from the pipe in relatively small streams to avoid erosion, and the pipe is commonly rotated so that these openings are at or near the bottom of the pipe.

The openings are circular as shown, with a slot 12 to receive the screw 13 which holds the cover 14 and valve 15 in position, with the cover on the outside and the valve on the inside. The cover 14 and the valve 15 are molded from rubber or any of the suitable plastic compounds and materials, such as nylon and the like, for long life and prevention of corrosion. The cover 14 is concave to more or less conform to the pipe and is ribbed on the inside as shown at 16 to promote ready movement on the pipe with low coefficient of friction. The cover 14 is ribbed on the upper face, as illustrated at 17, to provide strength. The cover is also provided with a pair of ears, illustrated at 18 and 19, having openings 20 therethrough so that the covers may be slidingly engaged on operating rods 21.

A rectangular plate or valve 15 is formed in a convex form to fit the inside of the pipe and is of such material as to resist wear and corrosion and to stand up well under operating conditions. This valve 15 is provided with reinforcing portions or strips at 22.

A hook body or anchor 30 of hook 31, shown in FIGURES 4 and 5, has a longitudinal opening 32 therethrough to permit it to be received on the operating rod 21 and it may be secured to the rod by means of a set screw at the threaded opening 33.

The strip 34 connecting the anchor portion 20 and hook 31 is of flexible material to permit it to be raised to the disengaged position shown in dotted lines in FIGURE 5, but normally its stressing causes it to return to the down or engaging position shown in full lines. The hook 31 has a sloping under side 36 so that if it is pushed along by rod 21, as illustrated in FIGURE 5, the inclined under face will cause the hook to slide up over the ear 18 of the cover. After the toothed underside of the hook passes the ear 18, the resilience of the tongue 34 will cause the hook to drop to engage or latch over the ear 18. If the rod 21 is now moved in the other direction, the hook will draw the cover 14 and valve 15 along with it.

Referring to FIGURE 1, if the rod 21 is moved to its extreme left position, the hooks will engage the righthand ears 18 of whatever of the covers 13 are in the extreme lefthand or opened position. Movement of the rod to the right will cause the cover or covers to move to the right to cause its associated valve to partially or completely close the opening 11 as desired.

If, after closing or partially closing the valve, it is desired to again open the valve, all that is necessary to be done is to raise the hook by hand and move the cover to the left. Movement of the control rod 21 to the left, and then back to the right, will again close all the valves. Movement of the control rod 21 is secured by means of a lever 41. A band or ring 42 is clamped onto the pipe by means of the clamping members 43 and the operating lever 41 is engaged to an upstanding ear 44 on the ring 42 as by means of pivot 46. Another pivot point 47 spaced from the first pivot point, engages a slotted opening 48 in the clamping member 49, which is employed to clamp the ends of one or more operating rods 21.

It is apparent that the control means may be positioned anywhere along the pipe as desired. The valves 15 are sufficiently flexible to be inserted through the openings 11, and when the screws 13 are tightened up, the valves and cover are secured to one another with the screw 13 between the two parts located in the slot 10 of opening 11.

The control system I have described is a relatively inexpensive system to manufacture and is simple in construction and operation and low in first cost and operational cost.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In an above-ground irrigation system having multiple discharge openings and multiple closure means for selectively opening and closing the openings, of the type which include, at each opening, a valve inside the pipe, a cover outside the pipe and a connection extending through the opening connecting the cover and valve, and in which longitudinal movement of the covers outside and valves inside along the pipe in one direction uncovers the openings and movement in the other covers them again, means for causing movement of the covers in one direction including a rod extending longitudinally of the pipe and a block on the rod at each cover with the rod positioned in relation to the covers to cause the block to strike and push the cover as the rod is moved in the opening direction to push the covers and valves in the direction to uncover the openings, and means for moving the covers in the opposite direction including an ear on each cover and a latch on each block to engage the ear on each cover on movement of the rod in the opening position, whereupon movement of the rod in the opposite direction draws the covers and valves closed.

2. In the irrigation system control means as set forth in claim 1, a pair of ears on each cover with the ears aligned longitudinally of the pipe, and the ears having aligned openings therein to slidingly receive the operating rod.

3. In the irrigating system and control means set forth in claim 2, longitudinally aligned ears on each cover to slidingly receive the control rod, and a latch on the rod at each valve having a sloping underside to slide up over one of the ears of each cover and a spring to press it down to thus engage the ear.

References Cited

UNITED STATES PATENTS

| | | | |
|---|---|---|---|
| 506,064 | 10/1893 | Nowland | 49—449 |
| 1,194,952 | 8/1916 | Bushong | 251—145 X |
| 1,715,544 | 6/1929 | Eves | 61—12 |
| 2,918,251 | 12/1959 | Epp | 251—145 |

JACOB SHAPIRO, *Primary Examiner.*

U.S. Cl. X.R.

251—145, 291; 317—234; 307—284